UNITED STATES PATENT OFFICE.

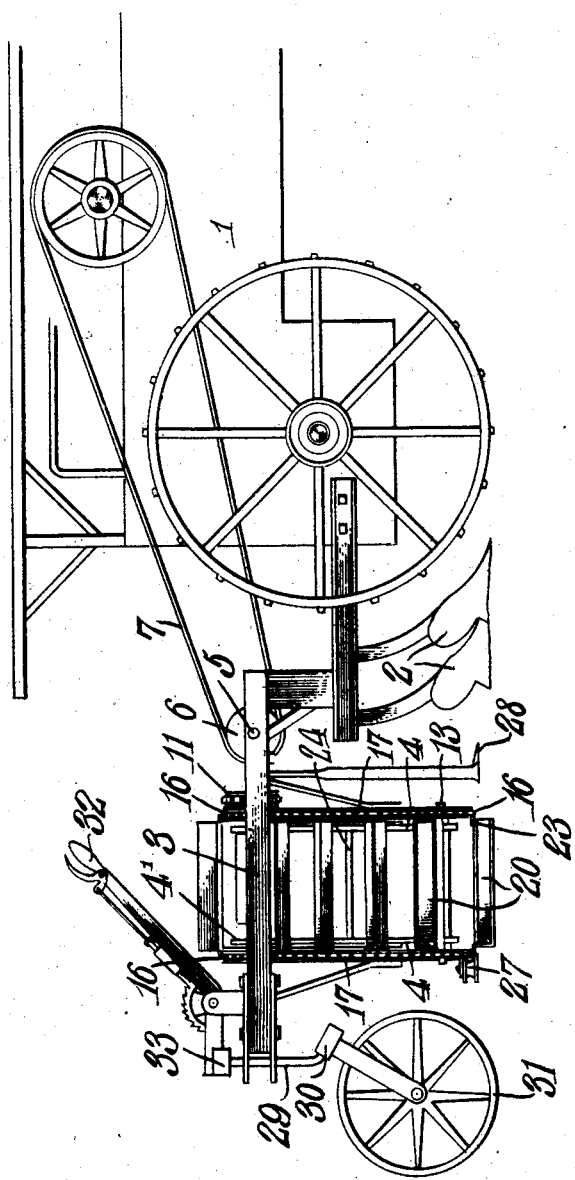

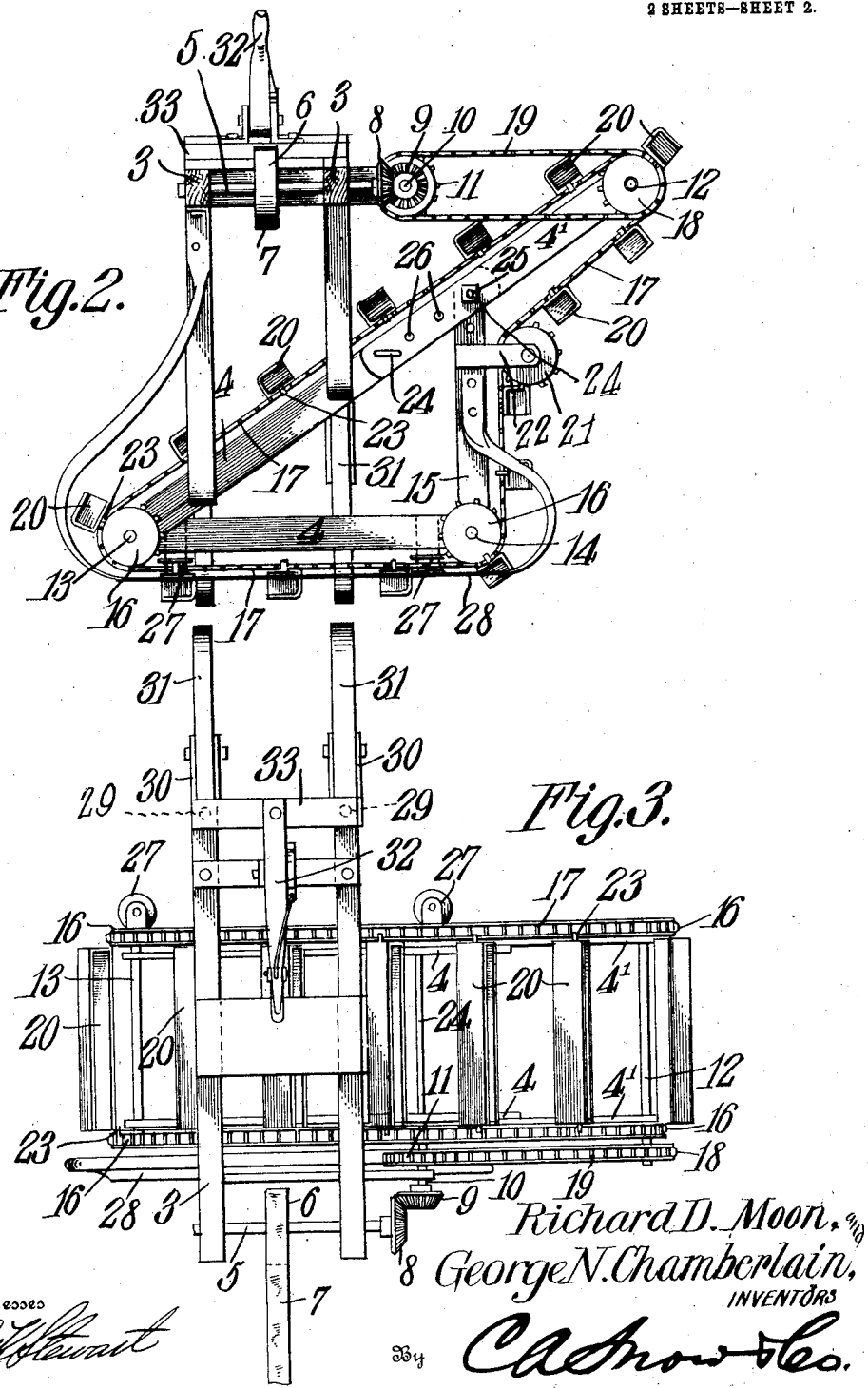

RICHARD D. MOON AND GEORGE N. CHAMBERLAIN, OF SAN ANGELO, TEXAS.

ROAD GRADER AND SCRAPER.

No. 905,904.　　　　Specification of Letters Patent.　　　　Patented Dec. 8, 1908.

Application filed September 30, 1907. Serial No. 395,276.

*To all whom it may concern:*

Be it known that we, RICHARD D. MOON and GEORGE N. CHAMBERLAIN, citizens of the United States, residing at San Angelo, in the county of Tom Green and State of Texas, have invented a new and useful Road Grader and Scraper, of which the following is a specification.

This invention has relation to road scrapers and graders and it consists in the novel construction and arrangement of its parts as hereinafter shown and described.

The object of the invention is to provide a device of the character indicated which is adapted to be drawn by a traction engine fitted with plows which loosen up the surface of the road.

The scraper and grader is provided with a soil breaking device, which is located in the rear of and in the line of travel of the plows and moves along or just above the surface of the road and operates upon material loosened by the plows and pulverizes the same to an extent whereby it may be easily and readily handled. A series of buckets is mounted upon the device and are adapted to move transversely to the line of travel of the plows and soil breaking device and scoop up and elevate the material loosened from the road and deposit the same to one side. A lever mechanism is provided for raising or lowering the grader at will.

In the accompanying drawing:—Figure 1 is a side elevation of the grader attached to a draft means. Fig. 2 is a front elevation of the grader, and Fig. 3 is a top plan view of the grader.

The grader or scraper is attached to a traction engine 1 which is provided with the plows 2. The grader consists of the superimposed frame 3 which is located over the lower frame 4. The shaft 5 is journaled for rotation at the forward portion of the frame 3 and is provided with a belt pulley 6 around which the belt 7 passes. The shaft 5 is provided with a beveled gear wheel 8 which meshes with the beveled gear wheel 9 attached to the stub shaft 10. The shaft 10 is also journaled for rotation in the frame 3 and is provided with a sprocket wheel 11. The shaft 12 is journaled for rotation at the upper portion of the frame 4. The said frame 4 lies in a generally inclined position under the frame 3. The shaft 13 is journaled for rotation at the lower end of the frame 4 and the shaft 14 is journaled for rotation in the brackets 15 which depend from the frame 4. The shafts 13 and 14 are substantially at the same horizontal level. The sprocket wheels 16 are attached to the shafts 12, 13 and 14 and the chain belts 17 pass around the sprocket wheels 16 of the said shafts, one belt being located at each side of the frame 4. The sprocket wheel 18 is attached to the shaft 12 and the sprocket chain 19 passes around the sprocket wheel 11 and the sprocket wheel 18. The buckets 20 are attached at their ends to the chain belts 17. The idle sprocket wheels 21 are journaled for rotation in the arms 22 attached to the frame 4 and engage the chain belts 17 and relieve the same of slack and also cause the upper and outer portions of the chain belt to move substantially in parallel planes. The buckets 20 are made of sheet metal and are provided at their ends with the lugs 23 which engage the links of the chain belts 17. The said buckets are open at their upper edges and forward ends but are closed at their rear ends, their sides and bottoms.

The frame 4 is preferably made in sections so that the upper section 4' thereof may be shifted longitudinally with relation to the lower section whereby the said frame may be elongated or contracted at will so that the buckets 20 may be caused to cast the earth from the grader at a desired point. The sections 4' are secured to the frame 4 by means of the rods 24 which pass transversely through the said sections and the frame proper and are secured by nuts 25, the frame 4 and sections 4' being provided with the perforations 26 for the reception of the said rods. The said rods and perforations constitute the means for adjusting the sections 4' with relation to the frame 4. The flanged wheels 27 are journaled for rotation at the rear side of the frame 4 and bear against the lower portion of the rear chain belt 17 and serve to retain the said belt upon the sprocket wheels 16 attached to the shafts 13 and 14. The blade 28 is attached to the forward side of the frame 4 and is adapted to engage the material loosened up by the plows 2. The shafts 29 are journaled at the rear end of the frame 3 and may slide longitudinally in their bearings. Yokes 30 are attached to the lower ends of the shafts 29 and the wheels 31 are journaled in said yoke. The lever 32 is fulcrumed upon the frame 3 and is provided with a head block 33 which lies over the upper ends of the shafts 29. By manipulating the lever 32 the said shafts 29 may be forced down through their bearings so that the frame 3 and its attachments will be elevated with relation to the surface of the road whereby the blade 28 and the buckets 20 may be raised above the surface of the road. The said lever 32 may be also manipulated to regulate the depth at which the said blade and buckets may enter the material at the surface of the road.

The operation of the device is as follows: As it is drawn by the traction engine 1 along the road the blade 28 engages the material loosened by the plows 2 as above described. After the material is operated upon by the said blade it is scooped up by the buckets 20 and carried along the frame 4 to the upper end thereof and along the sectional extensions 4' thereof and is deposited to one side of the road as the buckets turn to descend under the frame 4. The said buckets 20 are open at their upper edges and forward ends in order to more readily receive the material.

Having described the invention what we claim as new and desire to secure by Letters-Patent is:—

1. In a grader an earth loosening member moving in the line of draft and a scoop moving transversely of the line of movement of the grader, and means for moving the scoop.

2. In a grader an earth loosening member moving in the line of draft, a series of earth scoops moving transversely of the line of movement of the grader, means for raising and lowering the scoops and means for moving the scoops.

3. In a grader, provided with plows, an earth breaking device located in the rear of the plows and in their line of travel, and a series of earth elevating scoops movable transversely to the line of travel of the plows and earth breaking device.

4. In a grader, provided with plows, an earth breaking device in the rear of the plows, and in their line of travel, and a series of earth elevating scoops movable transversely to the line of travel of the plows, and earth breaking devices in the rear thereof, said scoops being adapted to engage the ground transversely to the line of travel of the plows and earth breakers.

In testimony that we claim the foregoing as our own, we have hereto affixed our signatures in the presence of two witnesses.

RICHARD D. MOON.
GEORGE N. CHAMBERLAIN.

Witnesses:
H. S. BONNER,
W. B. HUNTER.